United States Patent
Keller et al.

(10) Patent No.: US 6,952,791 B2
(45) Date of Patent: Oct. 4, 2005

(54) METHOD AND CIRCUIT FOR INITIALIZING A DE-SKEWING BUFFER IN A CLOCK FORWARDED SYSTEM

(75) Inventors: James B. Keller, Palo Alto, CA (US); Daniel W. Dobberpuhl, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 588 days.

(21) Appl. No.: 10/044,549

(22) Filed: Jan. 11, 2002

(65) Prior Publication Data

US 2003/0105985 A1 Jun. 5, 2003

Related U.S. Application Data

(60) Provisional application No. 60/336,798, filed on Dec. 3, 2001.

(51) Int. Cl.[7] .................................................. G06F 1/04
(52) U.S. Cl. ..................... 713/503; 713/400; 710/52; 710/61
(58) Field of Search ............................... 713/400, 401, 713/500, 503; 710/52, 58, 61

(56) References Cited

U.S. PATENT DOCUMENTS

| | | |
|---|---|---|
| 4,419,739 A | 12/1983 | Blum |
| 4,866,310 A | 9/1989 | Ando et al. |
| 5,045,725 A | 9/1991 | Sasaki et al. |
| 5,224,129 A | 6/1993 | Lueker et al. |
| 5,357,613 A * | 10/1994 | Cantrell et al. ................. 710/61 |
| 5,448,715 A | 9/1995 | Lelm et al. |
| 5,640,605 A | 6/1997 | Johnson et al. |
| 5,768,529 A | 6/1998 | Nikel |
| 5,867,731 A | 2/1999 | Williams et al. |
| 5,999,023 A | 12/1999 | Kim |
| 6,067,629 A | 5/2000 | Murray et al. |
| 6,098,139 A * | 8/2000 | Giacobbe et al. ................ 710/58 |
| 6,269,413 B1 | 7/2001 | Sherlock |
| 6,370,600 B1 | 4/2002 | Hughes et al. |
| 6,414,903 B1 * | 7/2002 | Keeth et al. ................. 365/233 |
| 6,434,640 B1 | 8/2002 | Keller |
| 6,519,709 B1 * | 2/2003 | Kawauchi ..................... 713/400 |
| 6,744,834 B1 * | 6/2004 | Lo ............................. 375/354 |
| 6,751,235 B1 * | 6/2004 | Susnow et al. ............... 370/503 |
| 6,813,275 B1 * | 11/2004 | Sharma et al. ............... 370/412 |

OTHER PUBLICATIONS

AMD Athlon™ Processor Technical Brief, Dec. 1999, © Advanced Micro Devices, Inc., pp. 1–7.
AMD Athlon™ Processor Module Data Sheet, Jun. 2000, © Advanced Micro Devices, Inc., pp. 1–64.
LXT9785 Data Sheet, Sep. 2000, © Level One Communications, Inc., pp. 1–105.

* cited by examiner

*Primary Examiner*—Thuan Du
(74) *Attorney, Agent, or Firm*—Garlick Harrison & Markison LLP

(57) ABSTRACT

A method and circuit for initializing a buffer in a clock forwarded system. A buffer is configured for temporarily storing incoming data received on the clock-forwarded interface. The buffer may use a write pointer and a read pointer which may be clocked by two different clocks allowing independent write and read accesses to the buffer. In an initialization mode, a predetermined pattern of data may be written into an entry in the buffer. In one embodiment, a logic circuit may detect the predetermined pattern of data and may cause the value of the write pointer to be captured. A synchronizing circuit may synchronize an indication that the predetermined pattern of data has been detected to the clock used by the read pointer. The synchronizer circuit may then provide a initialize signal to the read pointer which stores the captured write pointer value into the read pointer. This captured write pointer value becomes the initial value of the read pointer, effectively offsetting the read pointer from the write pointer.

17 Claims, 4 Drawing Sheets

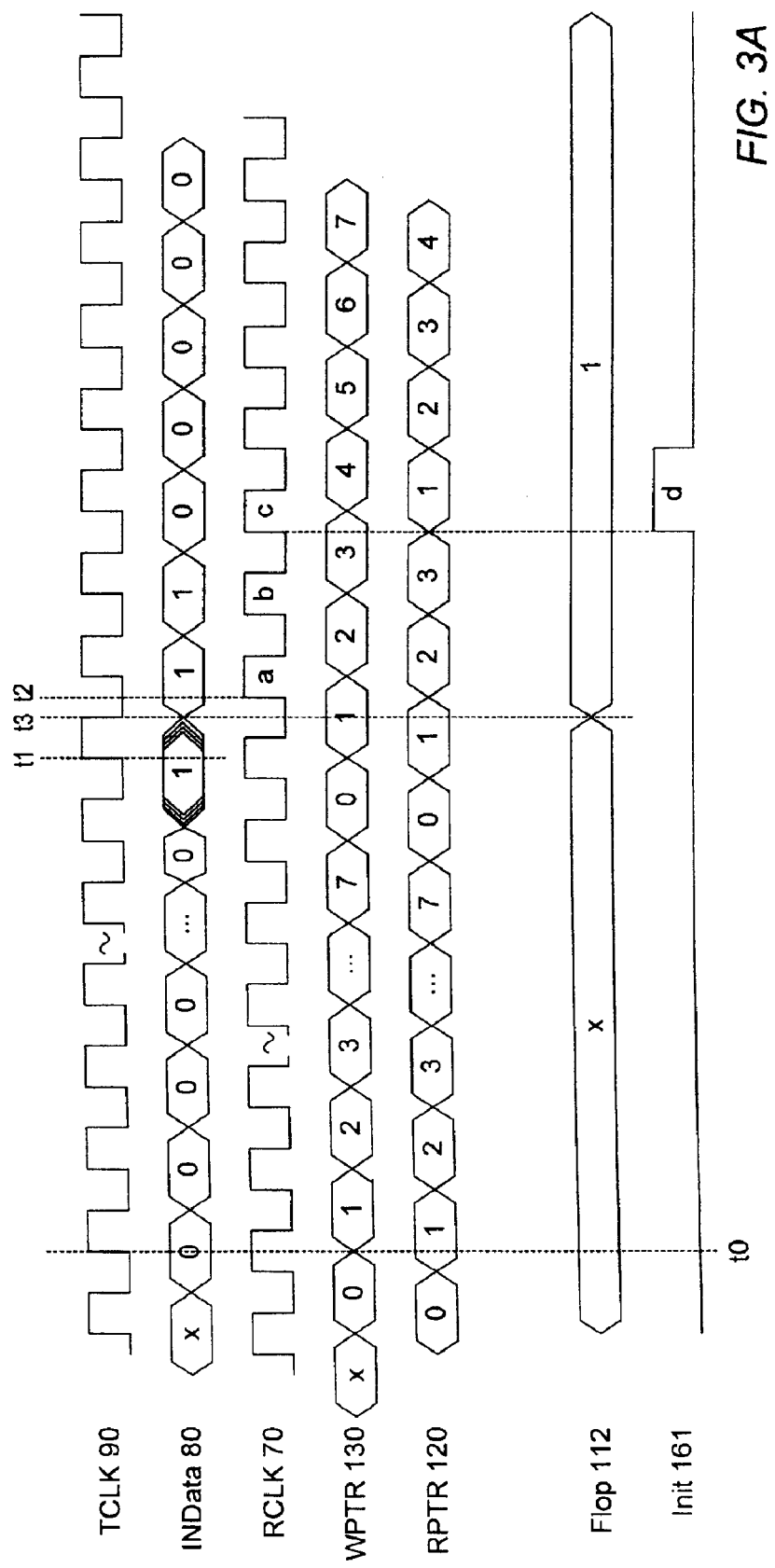

METHOD AND CIRCUIT FOR INITIALIZING A DE-SKEWING BUFFER IN A CLOCK FORWARDED SYSTEM

This application claims benefit of priority to U.S. Provisional Application Ser. No. 60/336,798, filed Dec. 3, 2001.

BACKGROUND OF THE INVENTION

1. Field of the Invention

This invention relates to clock forwarded communication systems.

2. Description of the Related Art

A clock forwarded interface is becoming more common in systems for communication between various devices within the system. Clock forwarded interfaces may typically offer higher speed, higher bandwidth communication among the devices as compared to traditional bus architectures. A clock forwarded interface generally includes point-to-point transfers of data between a sender and a receiver. The sender provides a clock, referred to as a forward clock, to the receiver that causes the receiver to capture the transmitted data. The sender synchronizes the transmitted data to the forwarded clock. The receiver may capture the data responsive to the forward clock and then synchronize the data to its own internal clock.

In a clock forwarded system, the clock provided by the sender and the receiver clock are typically derived from the same external clock source. Therefore, both clocks are frequency matched. However, due to such factors as internal component gate delays and clock trace length mismatches, the forwarded clock and the internal receiver clock may be out of phase with each other. This is referred to as static phase mismatch. Other factors, such a temperature variations, may cause the phase relationship to change during operation. This is referred to as dynamic phase mismatch. Since the phase relationship between the two clocks is unknown, the data is typically buffered at the receiving device using a first-in, first-out (FIFO) buffer. The FIFO buffer typically uses a write pointer and a read pointer which are clocked by the forward clock and the internal clock, respectively. Data received on the clock-forwarded interface is written into the FIFO buffer using the write pointer and read from the FIFO buffer using the read pointer. However, due to the phase difference between the clocks, the possibility of data corruption exists by reading data from the FIFO buffer before that data is stable from the write.

SUMMARY OF THE INVENTION

A method and circuit for initializing a buffer in a clock forwarded system is provided. The buffer is configured for temporarily storing incoming data received on the clock-forwarded interface. The buffer may use a write pointer and a read pointer which may be clocked by two different clocks allowing independent write and read accesses to the buffer. In an initialization mode, a predetermined pattern of data may be written into an entry in the buffer. In one embodiment, a logic circuit may detect the predetermined pattern of data and may cause the value of the write pointer to be captured. A synchronizing circuit may synchronize an indication that the predetermined pattern of data has been detected to the clock used by the read pointer. The synchronizer circuit may then provide an initialize signal to the read pointer which stores the captured write pointer value into the read pointer. This captured write pointer value becomes the initial value of the read pointer, effectively offsetting the read pointer from the write pointer. This separation of the write and read pointers may account for the static phase mismatch between the two clocks. Additional delay may be optionally added to the synchronizer circuit to provide margin for the dynamic phase mismatch.

Broadly speaking, a circuit is contemplated. The circuit comprises a buffer for storing data, wherein the buffer includes a plurality of entries; a write pointer coupled to the buffer, a read pointer coupled to the buffer, a first circuit, and a synchronizing circuit. The write pointer is configured to sequentially indicate each one of the plurality of entries in the buffer into which data is to be written, and is clocked by a first clock. The read pointer is configured to sequentially indicate each one of said plurality of entries in the buffer from which data is to be read, and is clocked by a second clock. The first circuit is configured to generate a pointer value in response to an indication that a predetermined pattern of data is transmitted to the buffer for storage. The first circuit is coupled to the read pointer. The synchronizing circuit is coupled to the read pointer and to receive the indication, and is configured to generate a signal to the read pointer responsive to the indication. The read pointer is configured to update to the pointer value from the first circuit responsive to the signal.

Additionally, a method of initializing a buffer is contemplated. A predetermined pattern of data transmitted for storage in one of a plurality of entries in the buffer responsive to a first clock is detected. A pointer value is generated in response to the detecting. An indication of the detecting is synchronized to a second clock. A read pointer is updated to the pointer value responsive to the synchronizing.

BRIEF DESCRIPTION OF THE DRAWINGS

Other objects and advantages of the invention will become apparent upon reading the following detailed description and upon reference to the accompanying drawings in which:

FIG. 3A is a first exemplary timing diagram illustrating the operation of one embodiment of receive buffer circuit 100 of FIG. 2.

Figure 1:
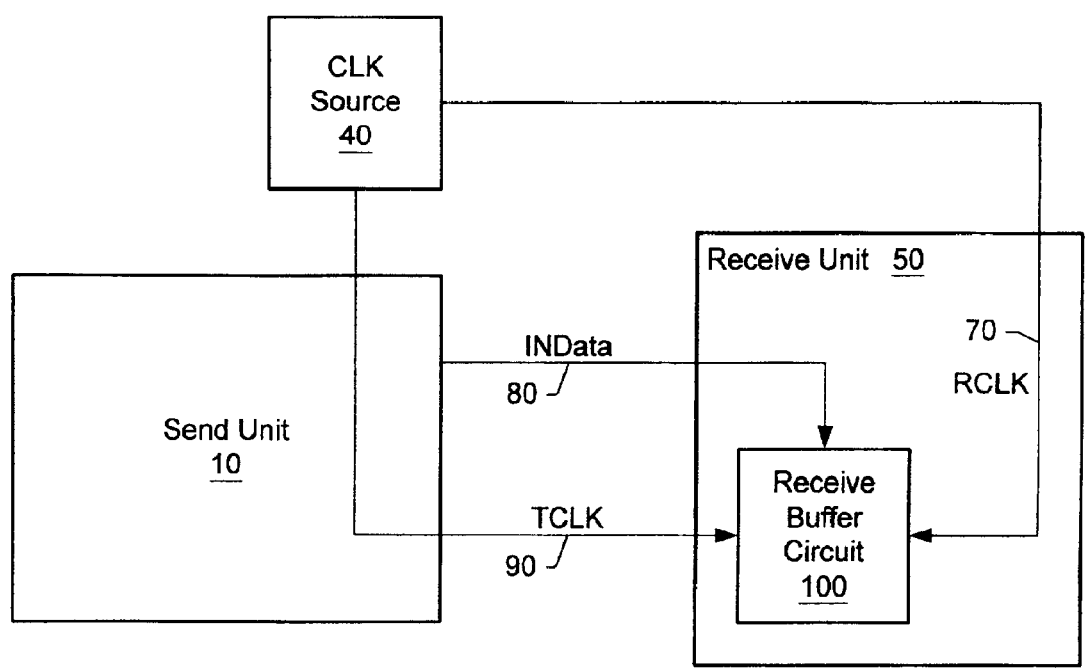
FIG. 1 is a block diagram of one embodiment of a clock forwarded system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a clock forwarded system is illustrated. A send unit 10 transmits data to a receive unit 50 through a first connection INData 80. INData is at least one bit wide and may be any desired number of bits wide. Send unit 10 also transmits a clock signal TCLK 90 to receive unit 50.

Generally, send unit 10 and receive unit 50 may include any devices (e.g. processors, peripheral devices, etc.). The transmitted data is synchronous to TCLK 90 such that in this example the data on INData 80 may be captured by a receive buffer circuit 100 on the rising edge of TCLK 90. It is noted however, that in other embodiments the falling edge of TCLK 90 or both edges of TCLK 90 may be used. In order to simplify the following description, the rising edge of TCLK 90 (and RCLK 70) will be used as the data reference, but as noted, the falling edge or both edges may be used in other contemplated embodiments. Data is written into receive buffer circuit 100 using TCLK 90 and read out of receive buffer 60 using a second clock signal RCLK 70, which is local to receive unit 50. RCLK 70 and TCLK 90 are frequency matched, but may not be phase matched. More particularly, RCLK 70 and TCLK 90 are sourced from the same clock source (CLK source 40 in FIG. 1). Both RCLK 70 and TCLK 90 may be generated from input clock signals from CLK source 40 (circuitry not shown).

As will be described in greater detail below, receive buffer circuit 100 may be configured with independent write and read pointers allowing independent write and read accesses. In order to ensure that the data is stable in receive buffer circuit 100 prior to reading it, the read pointer is offset from the write pointer using an initialization procedure.

Figure 2:
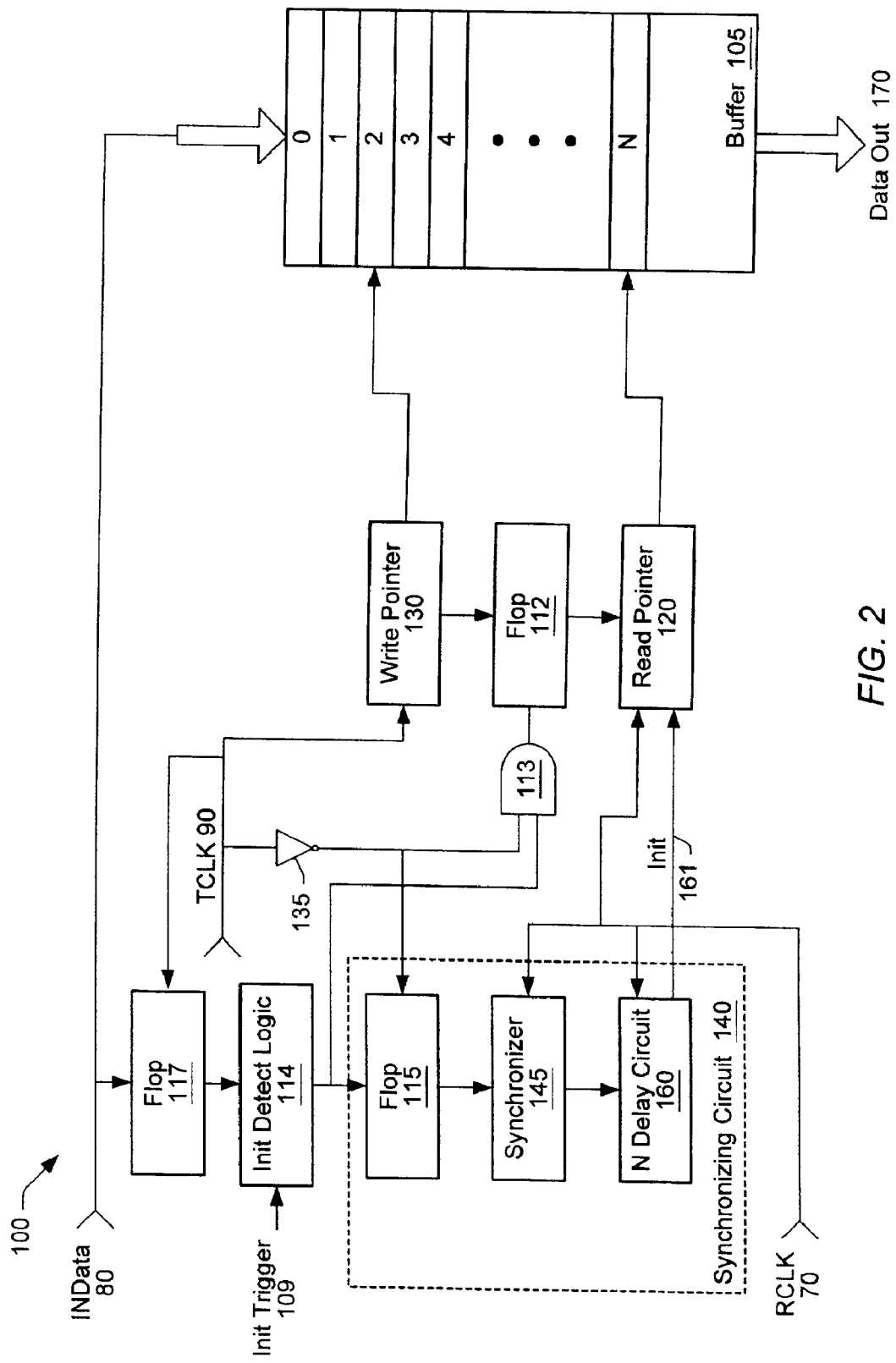
FIG. 2 is a block diagram of one embodiment of a receive buffer circuit.

Referring to FIG. 2, a block diagram of one embodiment of the receive buffer circuit 100 is shown. In the receive buffer circuit 100 of FIG. 2, a buffer 105 is coupled to a write pointer 130 and a read pointer 120, and is further coupled to receive the input data (ENData 80) and to provide output data (data out 170). A flop 112 is coupled to the write pointer 130 and the read pointer 120. The flop 112 is further coupled to an AND gate 113, which is coupled to receive an inversion of the TCLK 90 (through an inverter 135) and an output of an initialization detection logic circuit 114 (referred to below as "logic circuit 114"). The logic circuit 114 is coupled to a flop 117 which is coupled to receive the INData 80 and to a flop 115, which is further coupled to a synchronizer 145 and an N delay circuit 160. The N delay circuit 160 is further coupled to provide an init signal 161 to the read pointer 120. The logic circuit 114 is further coupled to receive in init trigger signal 109. The write pointer 130 and the flop 117 and flop 115 are clocked by the TCLK 90, while the synchronizer 145, the N delay circuit 160, and the read pointer 120 are clocked by the RCLK 70.

Buffer 105 may include a plurality of entries, each of which are capable of storing a data transfer from INData 80. In other words, each entry is capable of storing the number of bits transferred on INData 80 in response to one edge of TCLK 90. The entries of buffer 105 are addressed by write pointer 130 and read pointer 120. Write pointer 130 may include a counter circuit which is clocked by TCLK 90 and may run continuously. In this particular embodiment, the counter circuit is an up counter and is incremented for each data transfer (modulo the number of entries in buffer 105). However, it is contemplated that, in other embodiments, the counter may be a down counter that is decremented for each data transfer (modulo the number of entries in buffer 105). Write pointer 130 points to the entry in buffer 105 that data arriving on INData 80 will be written to responsive to the next rising edge of TCLK 90. Therefore, upon transfer of data synchronized to TCLK 90, data is written into a buffer 105 entry indicated by the value in the write pointer and the write pointer is incremented to address the next entry.

To read data out of buffer 105 (e.g. via a data out port 170), read pointer 120 is used. Read pointer 120 points to the entry in buffer 105 from which data will be read responsive to RCLK 70. Generally, data is read as frequently as it is written (e.g. on the rising edge, falling edge or both). Read pointer 120 may include a counter circuit which is clocked by RCLK 70 and may run continuously. It is noted that in this particular embodiment the counter circuit is an up counter, but it is contemplated that in other embodiments the counter circuit may be a down counter. Data is read out of an entry in buffer 105 indicated by the value in the read pointer and the read pointer is incremented to address the next entry responsive to RCLK 70.

To ensure that the data written to buffer 105 is stable prior to reading it, read pointer 120 is initialized with separation from write pointer 130. This initialization process is described next. After a system reset or other circuit main reset, receive buffer circuit 100 is initialized. A predetermined initialization value may be written into each entry in buffer 105, if desired, although other embodiments may not initialize the buffer entries. In this example, the predetermined initialization value may be all zeros. However, it is noted that the value may be any value. The initialization values are written for a number of cycles at least equal to the number of entries in buffer 105. The initialization values may be written for a number of clock cycles greater than the number of entries in buffer 105, as desired. A predetermined pattern of data is written to at least one entry in buffer 105. In this particular example, the predetermined pattern of data is all ones. However, it is noted that the predetermined pattern of data may be any pattern that is different from the initialization value (if initialization is used). It is contemplated that the initializing data and the predetermined pattern of data may be transmitted by send unit 10 of FIG. 1. Alternatively, one or both of the initializing data and the predetermined pattern of data may come from a pattern generation circuit local to receive unit 50 (not shown).

When in initialization mode, logic circuit 114 is configured to detect reception of the predetermined pattern of data. The flop 117 captures data from INData 80 in response to the TCLK 90. The logic circuit 114 decodes the data to detect the predetermined pattern of data, and outputs a signal to the flop 115 and to the AND gate 113 indicating whether or not the pattern has been detected. The AND gate 113, in response to the TCLK signal being low (the inverted TCLK signal being high) and the output of the logic circuit 114 being high, causes the flop 112 to capture the value of the write pointer 130. The flop 112 provides the captured value to the read pointer 120. The counter circuit of read pointer 120 is set to the captured value in response to an activated init signal 161 from the synchronizing circuit 140 (described in more detail below).

Init trigger 109 activates the initialization mode, and may be activated in response to any initialization event (e.g. system reset). When not in the initialization mode, logic circuit 114 may not assert its output signal, thus preventing reinitializing the read pointer 120 during ordinary operating mode. Furthermore, the logic circuit 114 may assert the output signal in response to the first detection of the predetermined pattern of data and then may inhibit assertion of the output signal thereafter during initialization mode in order to capture the write pointer at the first detection of the predetermined pattern.

The synchronizing circuit 140 samples the output signal of the logic circuit 114 according to the TCLK 90 in the flop 115. Generally, and described in greater detail below, synchronizing circuit 140 synchronizes the output signal to the local clock domain of RCLK 70 (using the synchronizer 145). As described above, the synchronizer circuit 140 provides init signal 161 to read pointer 120 responsive to the output signal from the logic circuit 114. Specifically, once the synchronizer 145 synchronizes the output signal, the synchronizing circuit 140 may output the init signal 161. In the illustrated embodiment, an optional N delay circuit 160 is included and adds N clock cycles of delay to the output signal before asserting the init signal 161. It is noted that the delay (the "N") may be a static value, or may be configurable (e.g. the number of flops used may be programmable) and may be selected according to the conditions in a given system.

The synchronizer 145 may, for example, include two flip-flops connected serially and clocked by RCLK 70. The data input to the synchronizer may be the output of the flop 115. Other embodiments may use more or less flip-flops. On the first rising edge of RCLK 70 after the data appears at the input to the first flip-flop, the data is clocked to the output of the first flip-flop, which is the input to the second flip-flop. On the next rising edge of RCLK 70, the data is clocked to the output of the second flip-flop. In this way, the data is synchronized to RCLK 70. Two RCLK 70 cycles after the asserted detection signal is input to the synchronizer 145, the asserted signal propagates to the output of synchronizer 145, in this embodiment.

In this example, the output of synchronizer 145 is coupled to the input of the optional N delay circuit 160. The N delay circuit 160 delays the synchronized data by N cycles. The N cycle delay provides an additional separation between the read pointer 120 and the write pointer 130. The additional separation may allow a margin for dynamic phase mismatch between TCLK 90 and RCLK 70. The N delay circuit 160 may comprise a series connection of N flops clocked by the RCLK 70. In the example illustrated in FIGS. 3A–3B below, N delay circuit 160 delays the synchronized data by one cycle and N delay circuit 160 includes one flip-flop that is clocked by RCLK 70. In other embodiments, N delay circuit 160 may delay the synchronized data by more or fewer cycles, and may contain more or fewer flip-flops. It is also contemplated that N delay circuit 160 may include other circuit components that achieve the same delay response as the present embodiment.

The output of N delay circuit 160 is init signal 161, which is provided to read pointer 120. In response to receiving an active init signal 161, read pointer 120 updates its counter value to the captured write pointer value provided by flop 112. The timing relationships of receive buffer circuit 100 for one example are described in greater detail below with respect to FIGS. 3A–3B.

Write pointer 130 continues to run, responsive to TCLK 90, as the predetermined data pattern is detected and synchronized to RCLK 70. Thus, when read pointer 120 is updated to the captured write pointer value, there is separation between the read pointer 120 and the write pointer 130.

It is noted that, while the logic circuit 114 is shown in FIG. 2, other embodiments may eliminate the logic circuit 114 and the flop 115. For example, the predetermined pattern of data may be one bit of the data on INData 80 (or, in the case of a predetermined pattern of all ones or all zeros, one bit may be sufficient to detect the pattern). In such cases, the flop 117 may capture the bit of the INData 80 as the pattern detection signal.

An alternative embodiment is contemplated in which a second logic circuit is coupled to the buffer 105. The second logic circuit detects which of the entries of the buffer 105 is updated with the predetermined pattern of data and generates a pointer value indicative of that entry. In such an embodiment, the second logic circuit may replace the flop 112 and the AND gate 113.

It is noted that, while flop circuits 112, 115, and 117 are shown in FIG. 2 (and are described as part of an example of the synchronizer 145 and the N delay circuit 160), any clocked storage device may be used in other embodiments (e.g. flops, registers, latches, etc.).

Figure 3B:
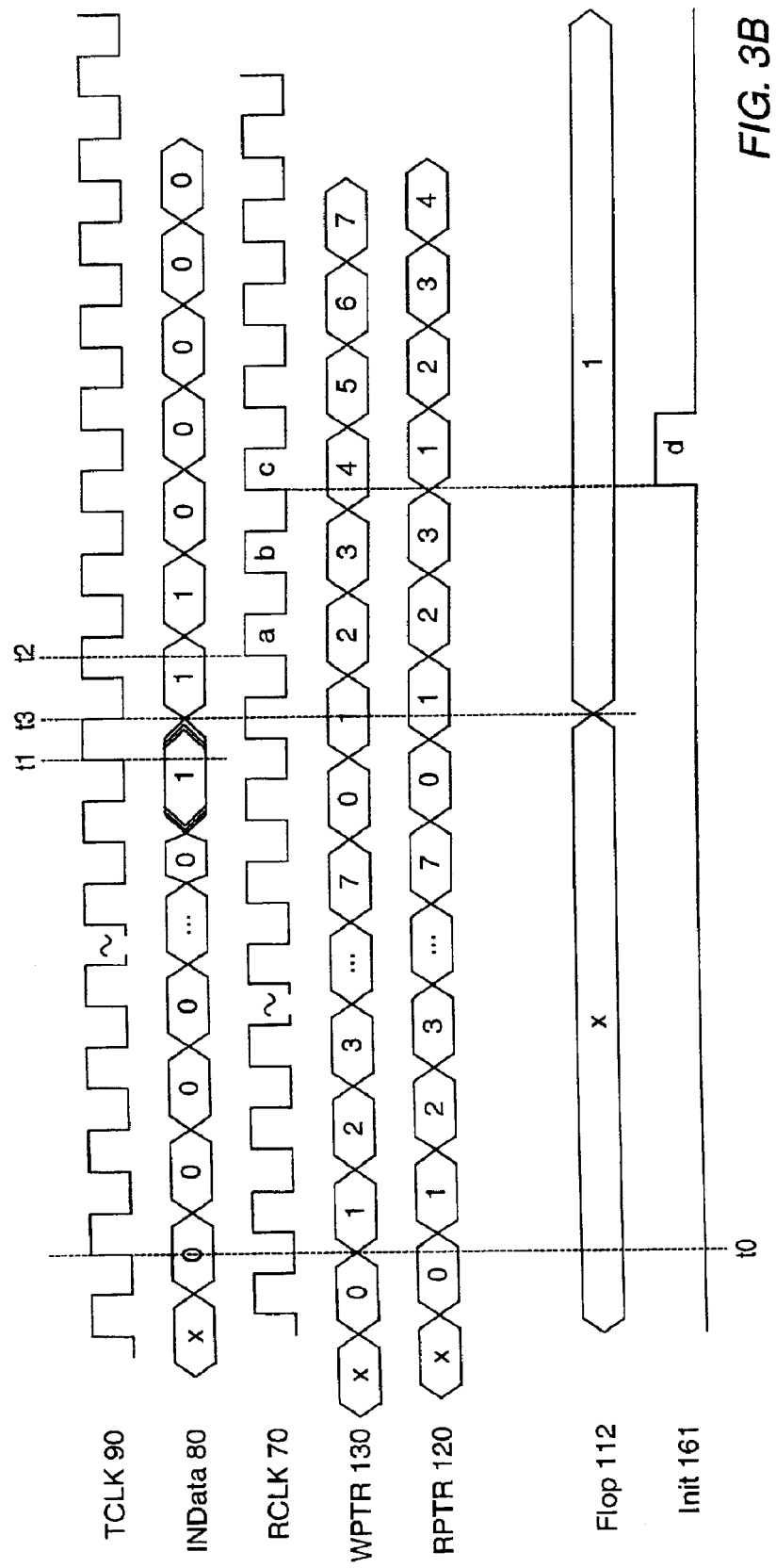
FIG. 3B is a second exemplary timing diagram illustrating the operation of one embodiment of receive buffer circuit 100 of FIG. 2.

Turning now to FIG. 3A, an exemplary timing diagram of one embodiment of receive buffer circuit 100 of FIG. 2 is shown. The timing diagram of FIG. 3A, in conjunction with circuit elements of FIG. 2, illustrates the relationships between the TCLK signal and its corresponding data and write pointer and the RCLK signal and its corresponding read pointer. In FIGS. 3A–3B, the abbreviation RPTR is used for read pointer 120 and the abbreviation WPTR is used for write pointer 130.

Referring to timing reference t0, INData is synchronized to TCLK such that ideally the transferring edge of TCLK would be placed in the center of any data window (e.g. the rising edge in the illustrated embodiment or, in embodiments in which the falling edge or both edges are used, the falling edge or the falling and rising edges). Thus, a receiving device such as, for example, buffer 105 of FIG. 2 may capture the data on that transmitting edge. It is noted however, that the data may not be centered around the rising edge of TCLK and may in fact be skewed to the left or right within some specified limits.

RCLK is frequency matched to TCLK but not in phase with TCLK. As shown in the example of FIG. 3A, the rising edge of RCLK occurs before the rising edge of TCLK. This example depicts one way that TCLK and RCLK may be out of phase with each other. Referring back to timing reference t0, the write counter value WPTR and the read counter value both start at zero, although any random values could occur in various embodiments. At the rising edge of each clock, the respective counter values increment to the next value.

Initialization data is written into buffer 105 of FIG. 2 for at least enough cycles to ensure that buffer 105 is initialized. As WPTR 130 increments, the data on INData 80 is all zeros for each data transfer. Thus, each entry of buffer 105 is initialized to all zeros. When the WPTR 130 reaches seven (assuming buffer 105 has eight entries for this example), it rolls over to zero again. Then, the data changes to all ones (the predetermined pattern of data for this example). While the data changes to the predetermined pattern of data when WPTR 130 is at entry zero in this example, the predetermined pattern may be transmitted when WPTR 130 is at any entry. On the next rising edge of TCLK (timing reference t1), the predetermined pattern data is stored into buffer 105 and flop 117. The logic circuit 114 of FIG. 2 detects the predetermined pattern of data in the flop 117 and asserts its output signal. On the next falling edge of TCLK (timing reference t3), in response to the asserted output signal of the logic circuit 114 and the inverted TCLK signal, the flop 112 captures the value of the write pointer 130 (the value is 1 in this example). It is noted that, in this embodiment, the logic circuit 114 may operate within ½ TCLK cycle. Additionally, at timing reference t3, flop 115 captures the asserted output signal. At the next rising edge of RCLK after timing reference t3 (timing reference t2 in the illustration), the first flip-flop of synchronizer 145 captures the asserted signal. This is depicted by the RCLK pulse labeled 'a'. On the rising edge of the next RCLK pulse, labeled 'b', the asserted signal is captured by the second flip-flop of the synchronizer 145. Subsequently, on the rising edge of the next RCLK pulse (labeled 'c' in FIG. 3A), N delay circuit 160 of FIG. 2 captures the data. In this example, there is one flip-flop in the N delay circuit and so therefore there is a corresponding one-cycle delay. The output of the N delay circuit 160 is the init signal pulse on init signal 161 (labeled 'd' in FIG. 3A). This pulse causes RPTR 120 to update to the value from flop 112 (i.e. one in this example).

Turning now to FIG. 3B, a timing diagram of one embodiment of receive buffer circuit 100 of FIG. 2 is shown. Similar to the description of FIG. 3A, the timing diagram of FIG. 3B also illustrates the relationships between the TCLK signal and its corresponding data and write pointer and the RCLK signal and its corresponding read pointer. However, in FIG. 3B, the rising edge of RCLK occurs after the rising edge of TCLK. This example shows another way that TCLK and RCLK may be out of phase with each other.

Similar to FIG. 3A, the first transfer of the predetermined pattern of data is captured at timing reference t1, and at timing reference t3 the value of the write pointer is captured and the asserted output signal of the logic circuit 114 is captured by the flop 115. The capturing of the data by the synchronizer circuit 140 is illustrated at timing reference t2. The asserted signal flows through synchronizer circuit 140 and results in an assertion of init signal 161 similar to the above description of FIG. 3A (and illustrated at 'a', 'b', 'c' and 'd' similar to the above description).

Numerous variations and modifications will become apparent to those skilled in the art once the above disclosure is fully appreciated. It is intended that the following claims be interpreted to embrace all such variations and modifications.

What is claimed is:

1. An apparatus comprising:
    a buffer for storing data;
    a write pointer coupled to the buffer, wherein the write pointer is configured to point to an entry in the buffer into which data is to be written, the write pointer to be clocked by a first clock;
    a read pointer coupled to the buffer, wherein the read pointer is configured to point to an entry in the buffer from which data is to be read, the read pointer to be clocked by a second clock that has a same clock frequency as the first clock; and
    a circuit configured to transfer a pointer value of the write pointer as the read pointer in response to an indication that a predetermined pattern of data is transmitted to the buffer for storage; and
    a synchronizing circuit coupled to the circuit to receive the indication of the predetermined pattern and, in response, to compensate for a skewing of the second clock from the first clock by synchronizing commencement of the read pointer to read from the buffer after data that is written into the buffer is stable.

2. The apparatus as recited in claim 1 wherein the circuit includes a storage circuit configured to capture the pointer value in response to the indication.

3. The apparatus as recited in claim 2 wherein the circuit includes a latch to latch the pointer value.

4. The apparatus as recited in claim 1, wherein the synchronizing circuit further includes a delay circuit to introduce a predetermined delay to delay commencement of the read pointer after commencement of the write pointer.

5. The apparatus as recited in claim 4, wherein the delay circuit is clocked by the second clock.

6. The apparatus as recited in claim 5, wherein the delay circuit includes a predetermined number of flip-flops.

7. The apparatus as recited in claim 5, wherein the delay circuit includes a configurable number of flip-flops.

8. The apparatus as recited in claim 1, wherein the write pointer includes a write counter to change a write pointer value to select subsequent entries in the buffer to write subsequent data.

9. The apparatus as recited in claim 8, wherein the write counter is an incremental counter.

10. The as recited in claim 9, wherein the read pointer includes a read counter to change a read pointer value to select subsequent entries in the buffer to read subsequent data.

11. The apparatus as recited in claim 10, wherein the read counter is an incremental counter.

12. The apparatus as recited in claim 1, wherein the circuit detects which entry or entries in the buffer is updated with the predetermined pattern of data.

13. A method of initializing a buffer comprising:
    detecting a predetermined pattern of data transmitted for storage in an entry in the buffer;
    generating a pointer value for a write pointer in response to the detecting the predetermined pattern of data to initialize writing of subsequent data;
    transferring the pointer value of the write pointer to a read pointer to initialize the read pointer;
    writing subsequent data into the buffer by changing the pointer value in the write pointer; and
    synchronizing the read pointer to commence reading from the buffer after a delay to compensate for a skewing of a first clock used to write data into the buffer and a second clock used to read data from the buffer, the second clock having a same frequency as the first clock.

14. The method as recited in claim 13 wherein the synchronizing includes delaying for a predetermined number of cycles of the second clock.

15. The method as recited in claim 14, wherein the changing the pointer value in the write pointer includes incrementing a count responsive to the first clock.

16. The method as recited in claim 15 further comprising changing a read pointer value used by the read pointer by incrementing a count responsive to the second clock.

17. The method as recited in claim 13 wherein the generating a pointer value includes detecting which entry or entries in the buffer is updated with the predetermined pattern of data.

* * * * *